Oct. 20, 1931.  J. OHM  1,827,954
APPARATUS FOR PRODUCING NYSTAGMUS
Filed Feb. 24, 1928
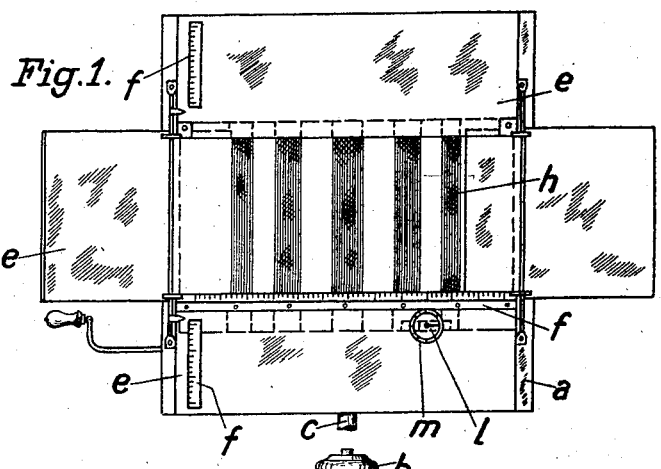
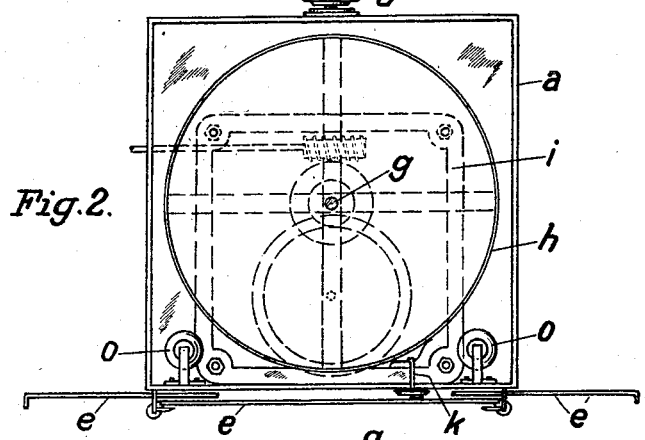
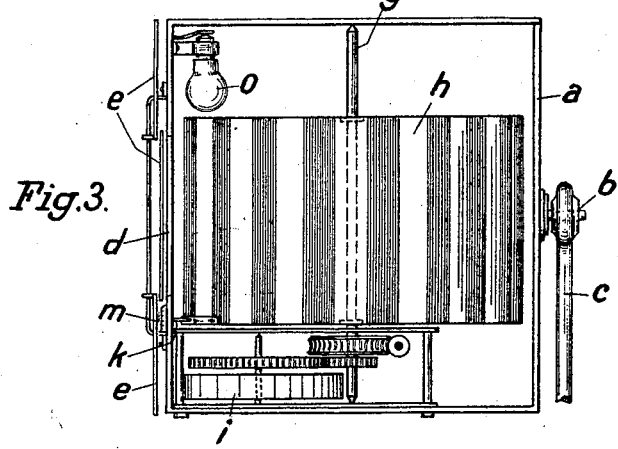
Inventor:
Johannes Ohm Patented Oct. 20, 1931

1,827,954

UNITED STATES PATENT OFFICE

JOHANNES OHM, OF BOTTROP, WESTPHALIA, GERMANY

APPARATUS FOR PRODUCING NYSTAGMUS

Application filed February 24, 1928, Serial No. 256,767, and in Germany March 7, 1927.

This invention relates to an apparatus for producing nystagmus.

For this purpose an optic turning wheel or turning drum or an optic turning dray have been used hitherto, which are driven by an electromotor and comprise curtains or slides designed to darken portions of the movable surface.

Of great importance at the examination of central skotoms and peripheral limitations of the range of vision is further the circumstance, that the moving surface appears to the physician under such a variable visual angle that sometimes it coincides with and is sometimes partly greater than the range of vision. There result therefore serious differences in the nystagmus produced, from which conclusions as to the kind of disease have to be made. These conditions have hitherto not been sufficiently considered in the apparatus of known type.

The following has to be taken into consideration: When examining the turning nystagmus, of a central skotom on the turning nystagmus, the so called window has to be screened or reduced by means of the slides or curtains in such a manner, that its retina-picture is not greater than the skotom. Otherwise the turning nystagmus would be released by the exposed periphery. When however peripheral limitations of the range of vision are in question, they can influence the turning nystagmus only, when the picture on the drum extends into the blind range. These conditions have for instance never been taken into consideration in devices comprising small drums.

Apparatus have become known, in which the entire retina can be included in the turning stimulation. In such apparatus the patient must however be seated in the rotating-drum, whereby the observation is made difficult and the drawing of a curve is excluded.

All these inconveniences are avoided by the apparatus according to the invention.

This apparatus is a cubical box designed to be placed at the height of the eyes, and in which a drum is rotatably mounted which, for instance at an eye-distance of 50 cm., appears under a visual angle of 33°.

The box is mounted on a stand in such a manner that it can be oscillated 360° around its pivot-axis.

The box has in the front-wall an aperture which can be partly covered from all four sides by slides. The accurate dimensions of the remaining uncovered portion of the aperture can be read on scales.

The drum is driven by a spring-motor and the revolving speed can be braked.

Covers on which figurative coloured representations are painted can be pulled over said drum in order to ascertain the nystagmus caused by different colours and forms.

Incandescent lamps or other sources of light are arranged in the box for lighting the drum and so that they are not visible to the observer.

Herefrom results that the outer side of the box is quite dark and does not draw on the attention of the observer.

An embodiment of the invention is illustrated, by way of example, in the accompany drawings, in which:

Fig. 1 is a front-elevation, and
Fig. 2 a top-plan-view, the top-plate of the box being removed.
Fig. 3 is a side-elevation, the corresponding side-wall of the box being removed.

The cubical box $a$ is mounted, by means of a pivot-pin $b$, in a stand $c$ so that it can be turned 360°. In the side-wall opposite the stand an aperture $d$ is arranged which from the two sides and from above and below may be reduced by means of slides $e$. Scales $f$ serve to indicate the accurate size of the uncovered portion of the aperture.

In the box $a$ a drum $h$, for instance of sheet-aluminium, is rotatably mounted by an axle $g$.

The axle $g$ is driven by a spring-motor $i$ of any convenient known construction which does not form part of this invention. Only the principal parts of this spring-motor are therefore indicated on the drawing. There is further arranged a brake $k$ consisting, for instance, of a screw with resilient bow acting upon the drum $h$. The outer end of the screw has a pointer $l$ adapted to move over a graduated disc $m$ designed to indicate the revolving speed of the drum.

The drum is uniformly rotated by the spring-motor. The outer surface of the drum is painted alternatively with white and black stripes. Covers of cardboard can be stripped over the drum on which figurative coloured pictures are painted. The apparatus is used in the following manner:—The patient sits at a distance of about 50 cms. from the apparatus and looks through the aperture at the drum rotating therein. If the drum is rotating from right to left, the eyes of the patient will perform a to-and-fro movement in endeavouring to focus the black stripes as they pass behind the aperture. This movement consists of a slow phase from right to left and a quick phase from left to right. The frequency or number of to-and-fro movements per second, their amplitude and their regularity can be noted by the doctor. These movements are dependent upon the nervous condition of the person examined, the condition of the eyes, the state of the junction lines between the eyes and eye muscles in the brain, the number and breadth of the stripes on the drum, the speed of rotation of the drum and the size of the aperture in the casing. Consequently it is possible to regulate the movements by varying the speed of rotation of the drum, the width and number of the stripes and the size of the aperture.

If the drum is rotated in the opposite direction, that is from left to right, the eyes of the patient will move slowly from left to right and quickly from right to left.

In the same way, if the drum rotates downwards, the eyes will move slowly in downward direction and quickly in upward direction, and inversely if the drum is rotated in upward direction. Thus the nystagmus can be determined in all cases, and it is employed to particular advantage for testing diseases of the retina and optic nerve, weak sightedness caused by squirt (amblyopic), half blindness caused by brain diseases, spontaneous nystagmus and many other diseases of the nerves and eyes.

The testing is easy and is mostly not disagreeable to the patient.

According to the direction in which the box is rotated in the stand the drum rotates to the right or to the left in upward or downward direction. Incandescent electric lamps $o$ are further arranged in the box to which current is supplied from a source of electric current not shown.

The stand $c$ is preferably fixed on a table.

I claim:—

1. An apparatus for producing nystagmus, comprising in combination a cubical box having an aperture in its front-wall, a drum rotatably mounted in said box with alternate black and white stripes on its periphery, a spring-motor for rotating said drum, slides in the front-wall of the box to regulate the uncovered portion of said aperture through which said rotating drum is to be observed, and scales on the front-wall indicating the accurate size of the uncovered portion of said aperture.

2. An apparatus for producing nystagmus, comprising in combination a cubical box having an aperture in its front-wall, a pivot-pin projecting from said box, a stand in which said pivot-pin is mounted so that the box can be turned 360° for producing nystagmus, a drum rotatably mounted in said box, a spring-motor for rotating said drum, slides in the front-wall of the box to regulate the uncovered portion of said aperture through which said rotating drum is to be observed, and scales on the front-wall indicating the accurate size of the uncovered portion of said aperture.

3. In an apparatus as specified in claim 1, in combination with the rotatable drum, covers painted on the outer side with figurative coloured pictures designed to be pulled over said drum.

4. In an apparatus as specified in claim 1, in combination with the box and the rotatable drum, incandescent electric lamps in said box for lighting the outer surface of said drum.

In testimony whereof I affix my signature.

JOHANNES OHM.